(12) United States Patent
McKee et al.

(10) Patent No.: US 9,605,772 B2
(45) Date of Patent: Mar. 28, 2017

(54) QUICK DISCONNECT SYSTEM

(75) Inventors: Larry Michael McKee, Livingston, TX (US); Matthew E. Wilson, Eureka, KS (US); Christopher Shen, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 13/472,210

(22) Filed: May 15, 2012

(65) Prior Publication Data

US 2013/0309016 A1 Nov. 21, 2013

(51) Int. Cl.
| | |
|---|---|
| F16L 1/20 | (2006.01) |
| F16L 37/00 | (2006.01) |
| F16L 37/62 | (2006.01) |
| F16L 39/00 | (2006.01) |
| E21B 33/035 | (2006.01) |
| E21B 17/06 | (2006.01) |

(52) U.S. Cl.
CPC .............. *F16L 1/202* (2013.01); *E21B 17/06* (2013.01); *E21B 33/0355* (2013.01); *F16L 37/002* (2013.01); *F16L 37/62* (2013.01); *F16L 39/00* (2013.01)

(58) Field of Classification Search
CPC ......... F16L 1/202; F16L 37/002; F16L 37/62; F16L 39/00; E21B 17/06; E21B 33/0355
USPC ..... 405/154.1, 158, 166, 169, 170; 166/340, 166/344, 345, 346; 242/407
See application file for complete search history.

(56) References Cited

U.S. PATENT DOCUMENTS

| | | | | |
|---|---|---|---|---|
| 3,190,307 | A * | 6/1965 | De Vries Douwe | 137/355.17 |
| 3,766,996 | A * | 10/1973 | Moody et al. | 173/197 |
| 3,831,545 | A * | 8/1974 | Cain | 242/394 |
| 3,958,594 | A * | 5/1976 | Masters | 137/355.17 |
| 4,730,677 | A * | 3/1988 | Pearce et al. | 166/345 |
| 5,671,811 | A * | 9/1997 | Head | 166/346 |

(Continued)

FOREIGN PATENT DOCUMENTS

| | | |
|---|---|---|
| RU | 2046247 C1 | 10/1995 |
| RU | 2246443 C2 | 2/2005 |

(Continued)

OTHER PUBLICATIONS

International Search Report and Written Opinion for International Application No. PCT/US2013/040020 dated Sep. 12, 2013.

(Continued)

*Primary Examiner* — Thomas B Will
*Assistant Examiner* — Jessica H Lutz
(74) *Attorney, Agent, or Firm* — Michael L. Flynn

(57) ABSTRACT

A technique for simultaneously releasing a plurality of control lines, and in particular to facilitate an oilfield operation with respect to a subsea wellbore. A hose reel or a plurality of hose reels may be mounted on a skid which, in turn, may be positioned on a vessel that works in cooperation with an offshore platform. Each hose reel is designed to engage a hose bundle via a release mechanism which releasably couples a plurality of control lines carried by the hose bundle. The release mechanism includes a primary release and a secondary release to selectively enable disconnection of the control lines and release of the hose bundle from the skid.

20 Claims, 7 Drawing Sheets

(56) References Cited

U.S. PATENT DOCUMENTS

| | | | |
|---|---|---|---|
| 5,848,646 A * | 12/1998 | Huber et al. | 166/297 |
| 6,276,456 B1 * | 8/2001 | Head | 166/359 |
| 6,702,519 B2 * | 3/2004 | Stockstill | 405/168.3 |
| 7,641,487 B2 * | 1/2010 | Morgan | 439/158 |
| 2004/0163802 A1 * | 8/2004 | Baugh et al. | 166/77.2 |
| 2007/0194164 A1 | 8/2007 | Saheta et al. | |
| 2008/0073085 A1 * | 3/2008 | Lovell et al. | 166/377 |

FOREIGN PATENT DOCUMENTS

| | | |
|---|---|---|
| RU | 72674 U1 | 4/2008 |
| SU | 1266963 A1 | 10/1986 |
| SU | 1803526 A1 | 3/1993 |
| UA | 17411 A | 5/1997 |

OTHER PUBLICATIONS

J.A. Noguera, R. Hampson, Q. B. Tran—Innovative Emergency Coiled-Tubing Disconnect System For Tender Barge Operations, SPE 129864, SPE/ICoTA Coiled tubing and Well Intervention Conference and Exhibition held in The Woodlands, Texas, USA, Mar. 23-24, 2010.

* cited by examiner

QUICK DISCONNECT SYSTEM

BACKGROUND

Well operations in shallow depth waters sometimes utilize a floating vessel in combination with an offshore platform having a wellhead, injector, and associated equipment. Coiled tubing and various hydraulic hoses and electric cables may extend between the floating vessel and the offshore platform. A coiled tubing catenary system creates slack in the coiled tubing between the injector and a reel mounted on the floating vessel. In case of severe weather or other operational considerations, the floating vessel is moved away from the offshore platform. Movement away from the offshore platform involves providing additional slack or releasing the hydraulic hoses and electric cables.

SUMMARY

In general, the present disclosure provides a system and method for facilitating an oilfield operation with respect to a subsea wellbore. A hose reel or a plurality of hose reels may be mounted on a skid which, in turn, may be positioned on a vessel that works in cooperation with an offshore platform, including but not limited to, a fixed platform, a compliant tower, a semi-submersible platform, a floating production and storage facility, a SPAR platform and the like. Each hose reel is designed to engage a hose bundle via a release mechanism which releasably couples a plurality of control lines carried by the hose bundle. The release mechanism comprises a primary release and a secondary release to selectively enable disconnection of the control lines and release of the hose bundle from the skid.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology related to production of hydrocarbons in an offshore environment. The system utilizes a quick disconnect system that may be used to quickly disconnect and release the hydraulic hoses and/or electrical cables connected between a floating vessel and an offshore platform, or between subsea and seafloor pipeline equipment, or for example, between seafloor equipment and an ROV (remotely operated vehicle) commonly used in deepwater operations. A quick disconnect system may be used on, for example, coiled tubing catenary jobs.

In some applications, the system is employed to facilitate a coiled tubing operation with respect to a subsea wellbore. A self-contained transportation skid may be positioned on a vessel, such as a barge. The vessel may be a floating vessel which works in cooperation with an offshore platform. Depending on the specifics of the application, the self-contained transportation skid may comprise a hose reel or a plurality of hose reels which are each designed to carry a hose bundle. By way of example, the hose bundles may comprise a plurality of control lines, such as hydraulic and/or electrical control lines for providing hydraulic and/or electrical communication with equipment on the platform. Examples of such control lines include hydraulic hoses and electrical cables.

Each hose reel may be a powered hose reel which works in cooperation with a release mechanism of a quick disconnect system. In some embodiments, the release mechanism may be coupled directly to the corresponding hose reel. For example, the release mechanism may be mounted within a cavity in a core of the hose reel. Each release mechanism is coupled with a hose bundle to enable selective disconnection of the control lines and release of the hose bundle from the self-contained transportation skid. In some examples, the self-contained transportation skid also comprises a retrievable flotation system which allows the hose bundle to float if it enters the surrounding water.

Figure 1:
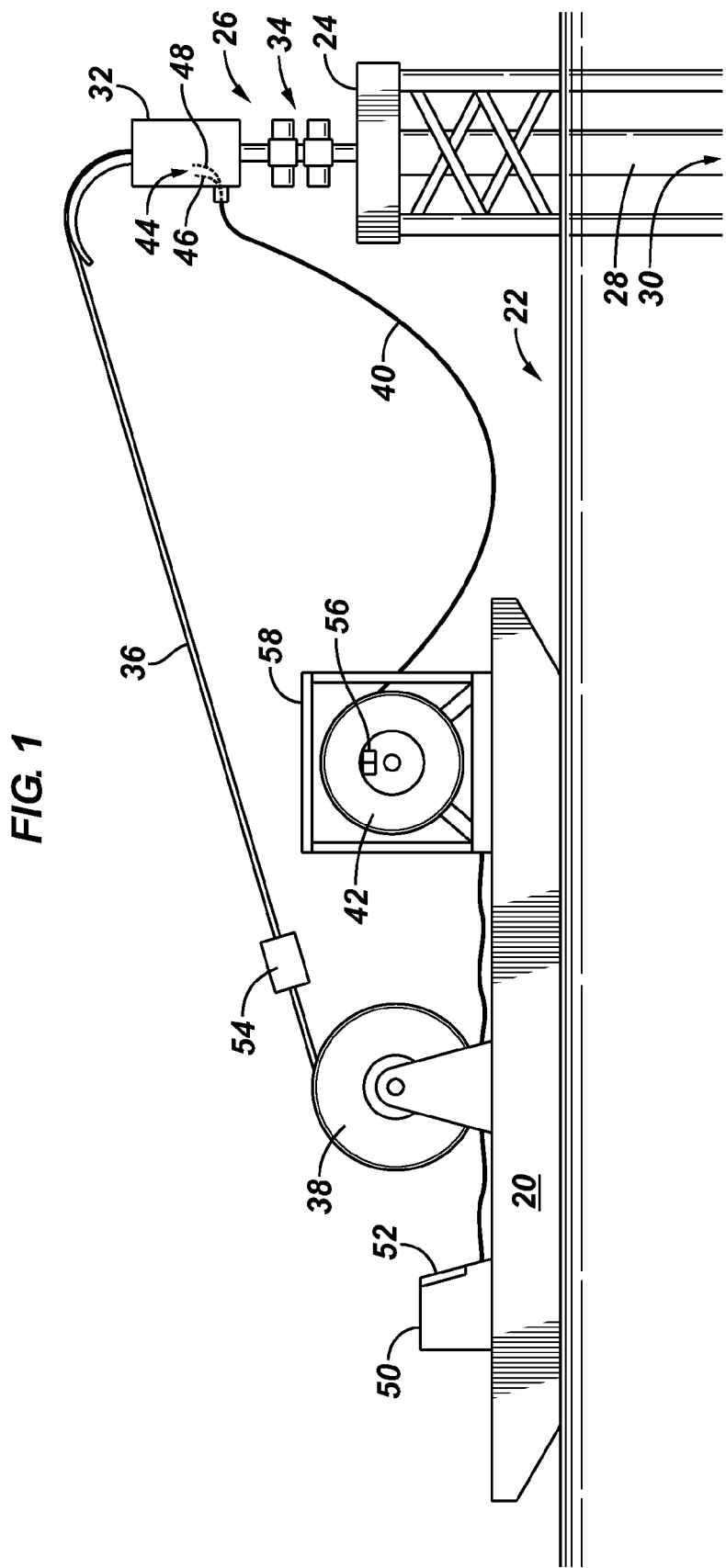
FIG. 1 is a schematic illustration of an example of a coiled tubing system having a quick disconnect system, according to an embodiment of the disclosure.

Referring to FIG. 1 an offshore well system is illustrated in which embodiments of the quick disconnect system described herein can be employed. The offshore well system may comprise a vessel, e.g. a barge, which works in cooperation with an offshore platform to facilitate the production of hydrocarbon fluids. In the illustrated example, the overall system is a coiled tubing catenary system but the quick disconnect technique may be used with other types of systems.

In the example illustrated in FIG. 1, a vessel 20 is deployed in an offshore environment 22 for work in cooperation with an offshore platform 24. By way of example, the offshore platform 24 may comprise a wellhead 26 positioned above a subsea well 28 having at least one subsea wellbore 30. The offshore platform 24 may comprise a variety of other components, such as an injector 32 and a blowout preventer (BOP) 34.

During an offshore operation, the vessel 20 may be coupled with offshore platform 24 by coiled tubing 36 which extends to injector 32 from a coiled tubing reel 38 mounted on vessel 20. The vessel 20 also may be coupled with offshore platform 24 via a hose bundle or a plurality of hose bundles 40. The hose bundle(s) 40 extend to components, e.g. injector 32, of offshore platform 24 from a corresponding hose reel or plurality of hose reels 42. Each hose bundle 40 may comprise a plurality of control lines 44, such as hydraulic control lines 46 and/or electrical control lines 48. A control cabin 50 having a control panel 52 may be located on vessel 20 for controlling both coiled tubing reel 38 and hose reel(s) 42.

Figure 2:
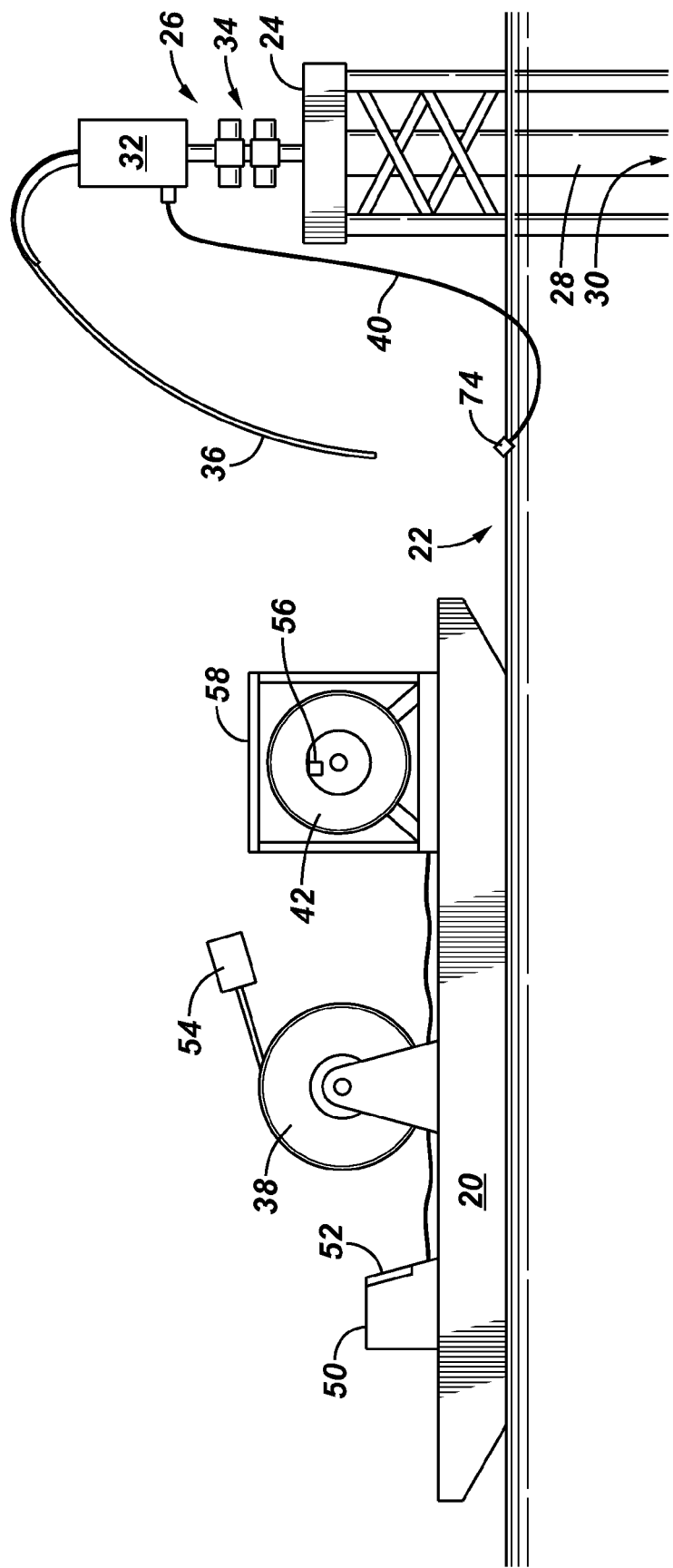
FIG. 2 is a schematic illustration similar to that of FIG. 1 but showing the hose bundle disconnected, according to an embodiment of the disclosure.

In the event of inclement weather or other occurrences encouraging separation of vessel 20 from platform 24, the coiled tubing 36 and the hose bundles 40 may be quickly released, as illustrated in FIG. 2. For example, a coiled tubing clamp and cutter 54 may be positioned to enable the coiled tubing 36 to be severed and released. Additionally, a quick disconnect system 56 enables rapid disconnection of the control lines 44 and release of the hose bundle(s) 40. In some applications, the quick disconnect system 56 may be mounted directly to the hose reel(s) 42 which, in turn, may be mounted in a self-contained transportation skid 58.

Figure 3:
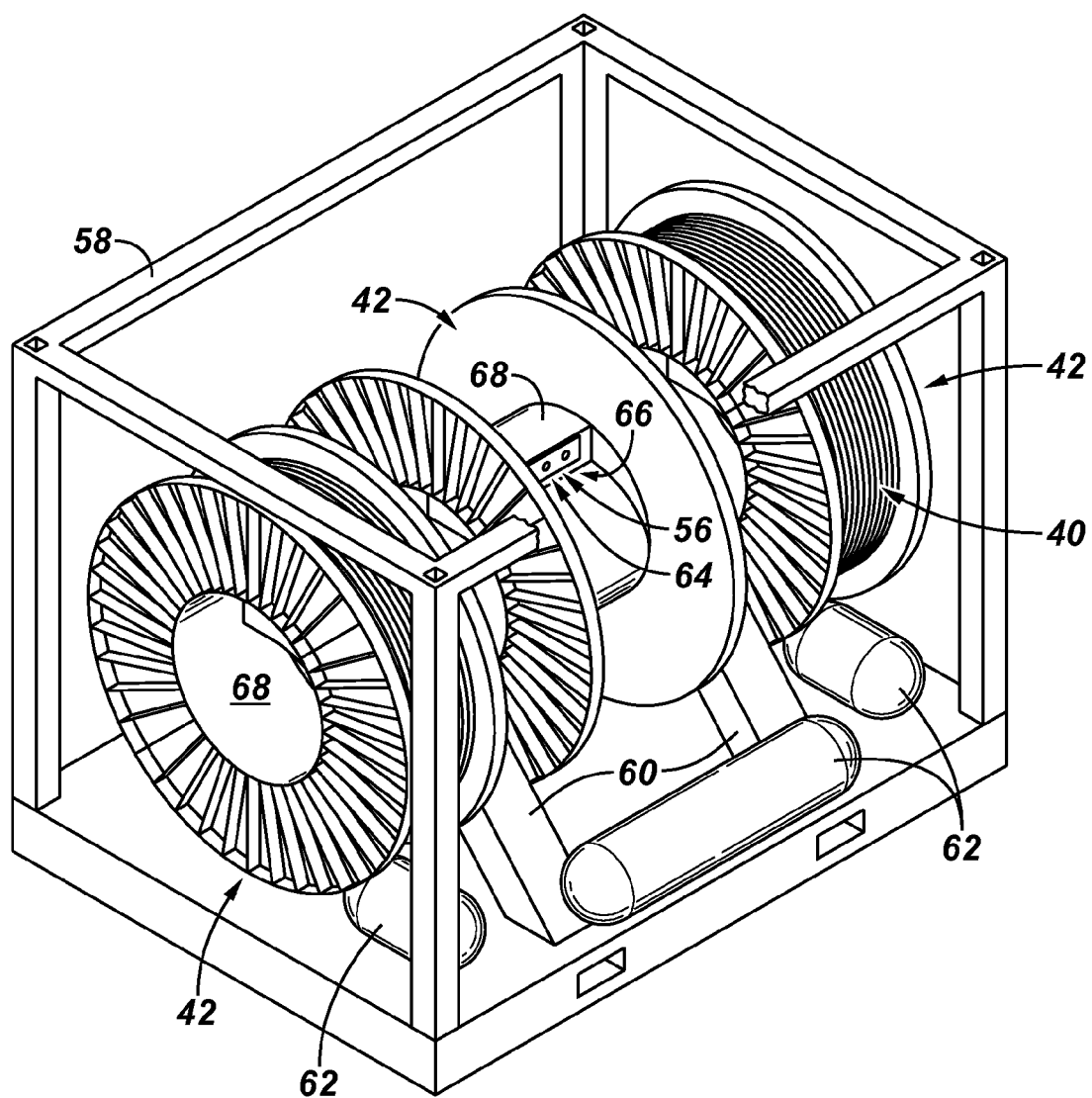
FIG. 3 is a view of an example of a plurality of powered hose reels mounted in a self-contained skid, according to an embodiment of the disclosure.

Referring generally to FIG. 3, an example of the self-contained transportation skid 58 is illustrated. In this embodiment, the skid 58 is designed to carry a plurality of hose reels 42, e.g. three hose reels 42, rotatably mounted on a support structure 60. Each hose reel 42 may be a powered hose reel designed to spool and unspool the corresponding hose bundle 40 (illustrated in outline in FIG. 3). Depending on the application, the self-contained transportation skid 58 also may comprise a retrieval flotation system 62 designed to float a connector plate 74 (described in more detail below) and at least a portion of its corresponding hose bundle 40 and facilitate retrieval of such from the surrounding water. The skid 58 also may be employed for providing the quick disconnect system 56. For example, the quick disconnect system 56 may comprise a release mechanism 64 associated with each hose reel 42. In the embodiment illustrated, each release mechanism 64 is positioned in a recess 66 formed in a core 68 of the corresponding hose reel 42.

In an operational example, the skid 58 comprises three powered hose reels 42 and remains on vessel 20 while the injector 32 and the blowout preventer 34 are connected to wellhead 26 on platform 24. Each hose reel 42 carries a corresponding hose bundle 40 used to connect the skid 58 to the corresponding equipment on offshore platform 24. By way of example, one hose bundle 40 may be designed to provide hydraulic power and electrical control for the injector 32, e.g. for the injector drive system. Another hose bundle 40 may be designed to provide hydraulic power for controlling injector 32, e.g. for supply hydraulic power to the injector control system, as well as for providing hydraulic power to auxiliary systems. A third hose bundle 40 may be designed to provide hydraulic power for the blowout preventer 34. However, the arrangement of hose bundles and the types of control lines, e.g. hydraulic and/or electrical, in each hose bundle may be adjusted according to the parameters of a given offshore well application.

Figure 4:
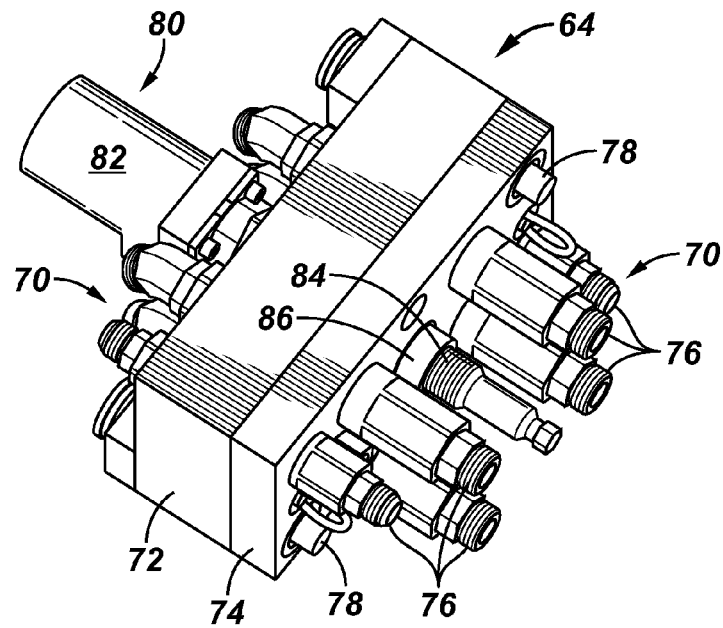
FIG. 4 is an illustration of an example of a quick disconnect system able to disconnect control lines of a hose bundle, according to an embodiment of the disclosure.
Figure 5:
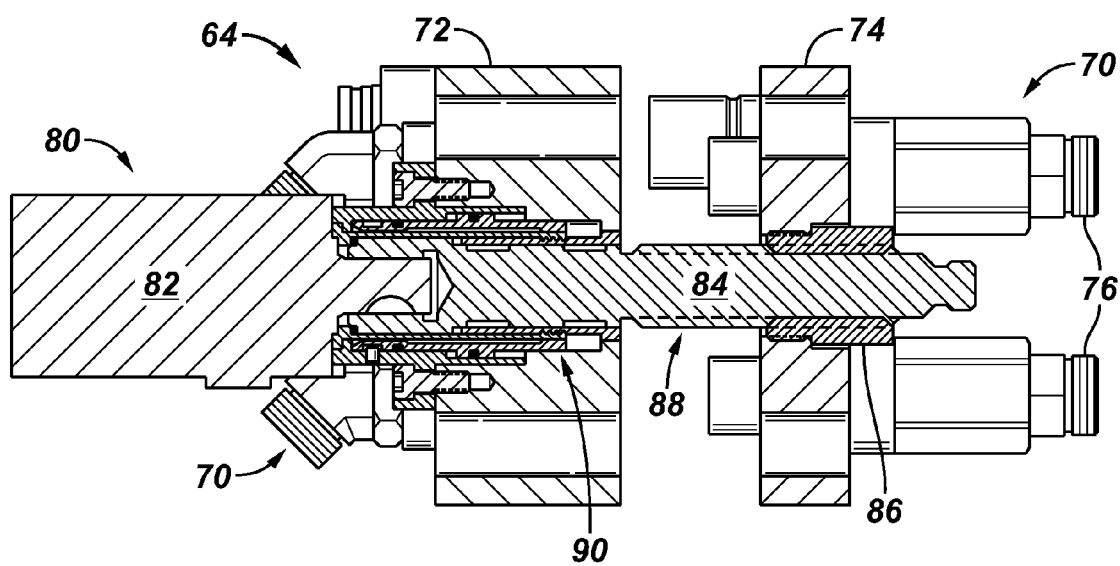
FIG. 5 is an illustration of various components that may be used in the quick disconnect system illustrated in FIG. 4, according to an embodiment of the disclosure.
Figure 6:
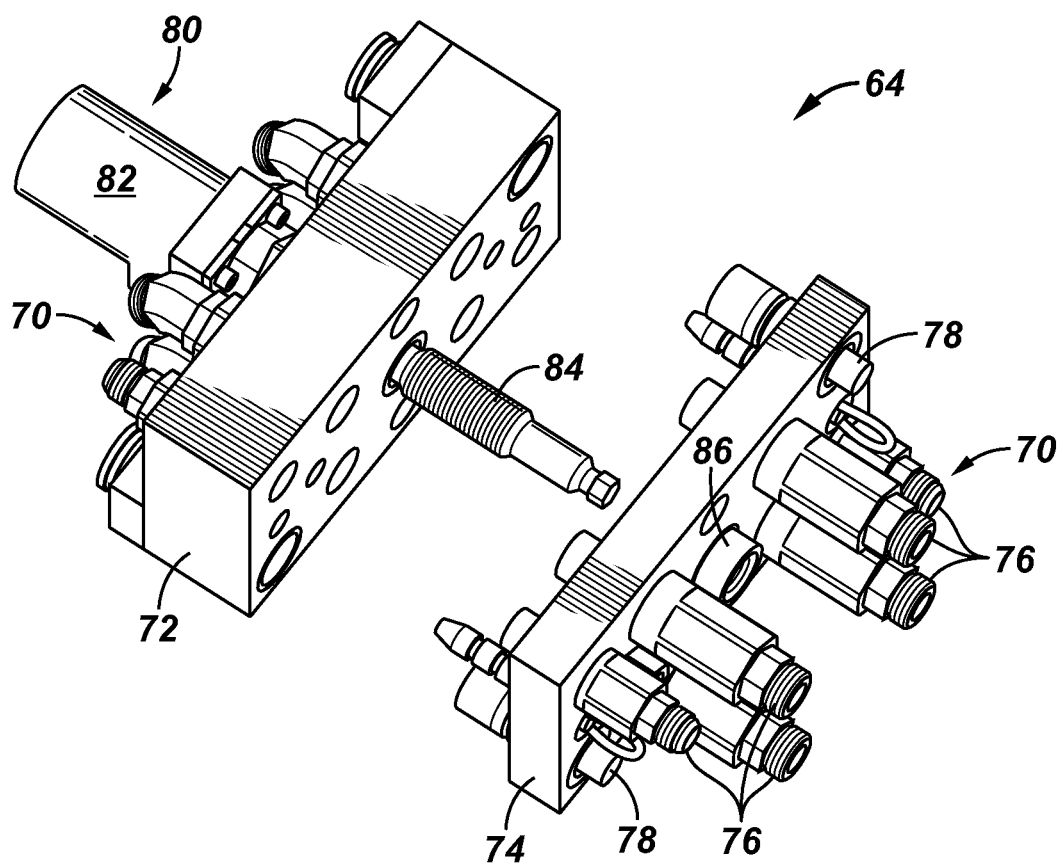
FIG. 6 is an illustration of the quick disconnect system of FIG. 4 in a disconnected configuration, according to an embodiment of the disclosure.

An embodiment of the release mechanism 64 is illustrated in FIG. 4. In this example, the release mechanism 64 comprises a plurality of couplers/connectors 70 designed to releasably couple control lines 44 of each hose bundle 40. The plurality of connectors 70 is mounted to a pair of coupling connector plates 72, 74 designed for selective movement into and out of engagement with each other. The connectors 70 may comprise a plurality of hydraulic connectors 76 and/or electrical connectors 78, e.g. male/female couplers, designed to provide a releasable coupling of, for example, hydraulic hoses and/or electrical cables. The release mechanism 64 also comprises an actuator 80 which is controllable to move connector plates 72, 74 and connectors 70 into engagement with each other, as illustrated in FIG. 4, or to disconnect the connector plates 72, 74 and connectors 70, as illustrated in FIGS. 5 and 6. By way of example, the actuator 80 may comprise a motor 82, e.g. a hydraulic motor, designed to rotatably drive a screw 84 received in a threaded nut 86 mounted in connector plate 74, as best illustrated in FIG. 5.

During a disconnection procedure, the actuator 80, e.g. motor 82, is controlled via input from control panel 52 and plates 72, 74 are separated from each other. For example, screw 84 may be rotated by motor 82 within nut 86 to force connector plate 74 away from connector plate 72 and thus to disconnect the connectors 70, as illustrated in FIG. 5. Continued rotation of screw 84 causes the nut 86 to eventually separate from the screw 84, thus fully releasing the connector plate 74 as illustrated in FIG. 6. The release of connector plate 74 effectively releases the attached hose bundle 40 from skid 58, as illustrated in FIG. 2. The release mechanisms 64 associated with corresponding hose reels 42 may be collectively or independently operated to disconnect the corresponding connectors 70 and to release the corresponding plates 74/hose bundles 40 from the skid 58.

Figure 7:
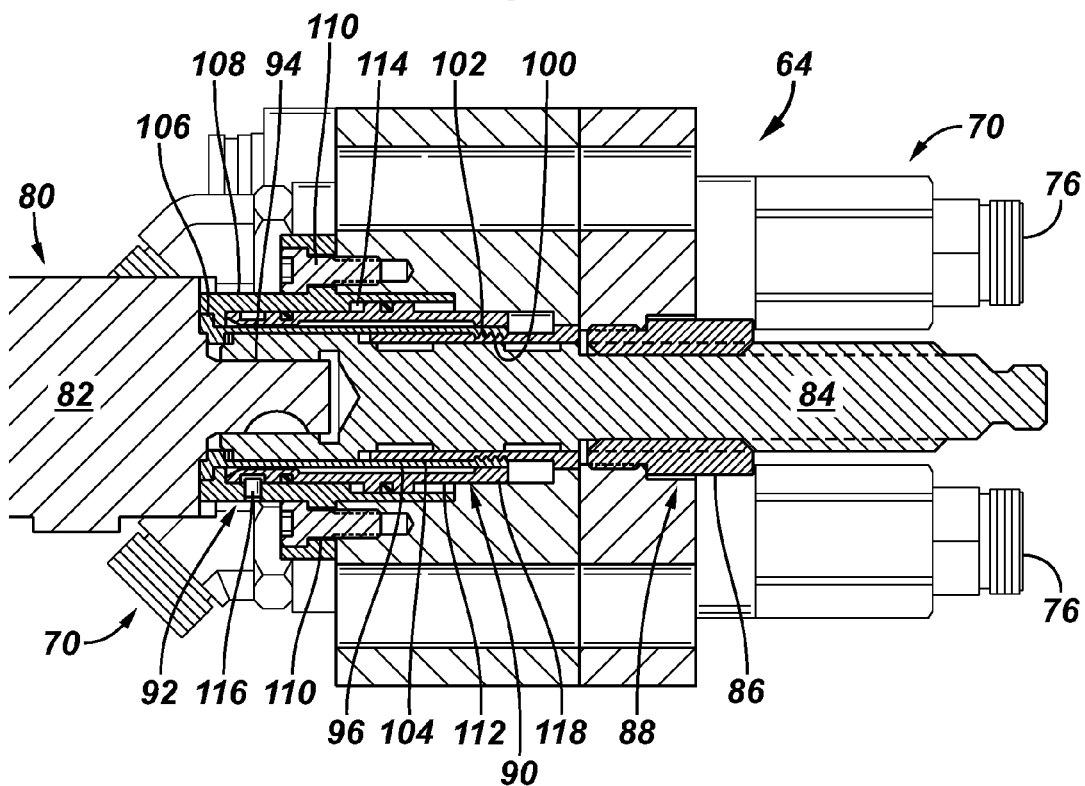
FIG. 7 is an illustration of an example of the primary and the secondary releases of the overall release mechanism located in the quick disconnect system, according to an embodiment of the disclosure.

With added reference to FIG. 7, each release mechanism 64 may be constructed with a primary release 88 and a secondary release 90. By way of example, the primary release 88 may be in the form of motor 82, screw 84, and threaded nut 86. When a release of the hose bundle 40 is desired, the primary release 88 may be actuated by supplying power to motor 82. If motor 82 is a hydraulic motor, hydraulic power is supplied to the motor 82 to cause rotation of screw 84 and consequent disconnection of connectors 70 and release of coupler plate 74. This allows the hose bundle or bundles 40 to separate from the floating vessel 20.

If desired, the secondary release 90 also may be used to disconnect the connectors 70 and to release the hose bundle 40 from skid 58. For example, if the primary release 88 fails to function properly, e.g. hydraulic power to motor 82 is interrupted, the secondary release 90 may be actuated to carry out the disconnection and release procedure.

Figure 8:
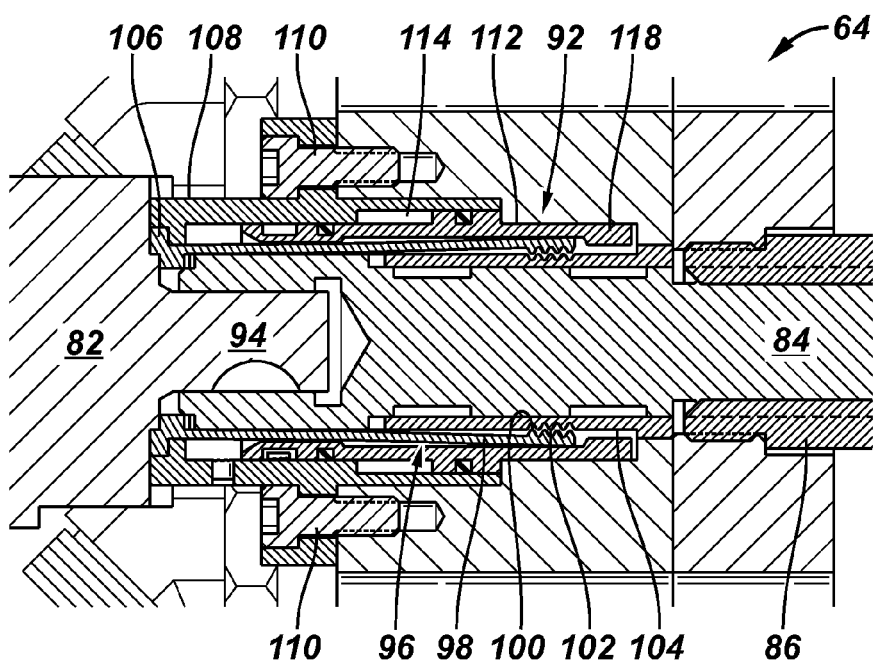
FIG. 8 is an enlarged illustration of an example of the secondary release shifted to a release configuration, according to an embodiment of the disclosure.

The secondary release 90 may be constructed in a variety of forms and configurations. In the illustrated example, however, secondary release 90 comprises a collet mechanism 92 which is used to hold screw 84 in position on a shaft 94 of motor 82, as illustrated best in FIG. 7. The collet mechanism 92 comprises a collet 96 having flexible collet fingers 98 with retention mechanisms 100 oriented to engage corresponding retention mechanisms 102 located on a bearing sleeve 104 of screw 84 (see also FIG. 8). To enable operation of screw 84, retention mechanisms 100 of collet 96 are held in engagement with corresponding retention mechanisms 102 of screw 84 to secure the screw 84 to motor 82, as illustrated in FIG. 7. However, the retention mechanisms 100 may be selectively released from corresponding retention mechanisms 102, as illustrated in FIG. 8. In the embodiment illustrated, collet 96 may be secured to connector plate 72 by an abutment end 106 held in engagement with a framework 108 secured to plate 72 via, for example, fasteners 110. Framework 108 also may be used to mount motor 82 to connector plate 72.

As illustrated, a slidable piston 112 may be used to control collet 96. The slidable piston 112 is slidably received in a hydraulic chamber 114 coupled with a suitable hydraulic supply line. For example, hydraulic chamber 114 and its associated hydraulic supply line may be designed for coupling with a hydraulic pump, e.g. a manual hydraulic pump or a powered hydraulic pump, designed to provide sufficient hydraulic power to shift the slidable piston 112 from the locked position illustrated in FIG. 7 to the unlocked position illustrated in FIG. 8. The slidable piston 112 may initially be secured in the locked position by a retention member 116, such as a shear screw. Additionally, the slidable piston 112 may comprise a release piston portion 118, e.g. a radially inward expanded ring, designed to hold collet 96 and retention mechanisms 100 in the locked position when the release piston portion 118 is held between retention mechanisms 100 and the surrounding surface of connector plate 72. When sufficient hydraulic pressure is applied to hydraulic chamber 114, retention member 116 is sheared or otherwise released and slidable piston 112 is shifted to an unlocked position, as illustrated in FIG. 8. During movement of slidable piston 114, the release piston portion 118 is moved away from collet fingers 98 to release retention mechanisms 100 from corresponding retention mechanisms 102.

Figure 9:
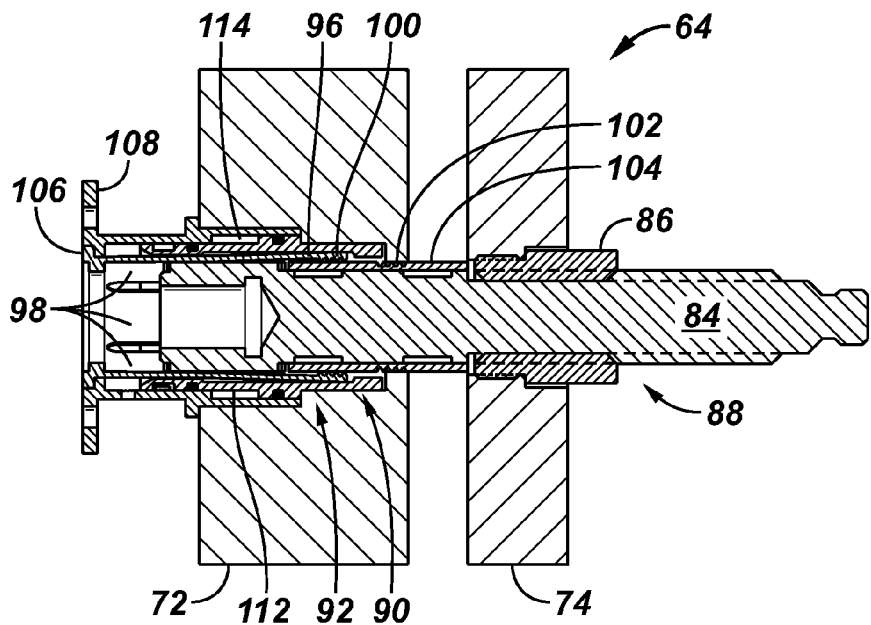
FIG. 9 is an illustration of the quick disconnect system after initiating disconnection via release of the secondary release mechanism, according to an embodiment of the disclosure.
Figure 10:
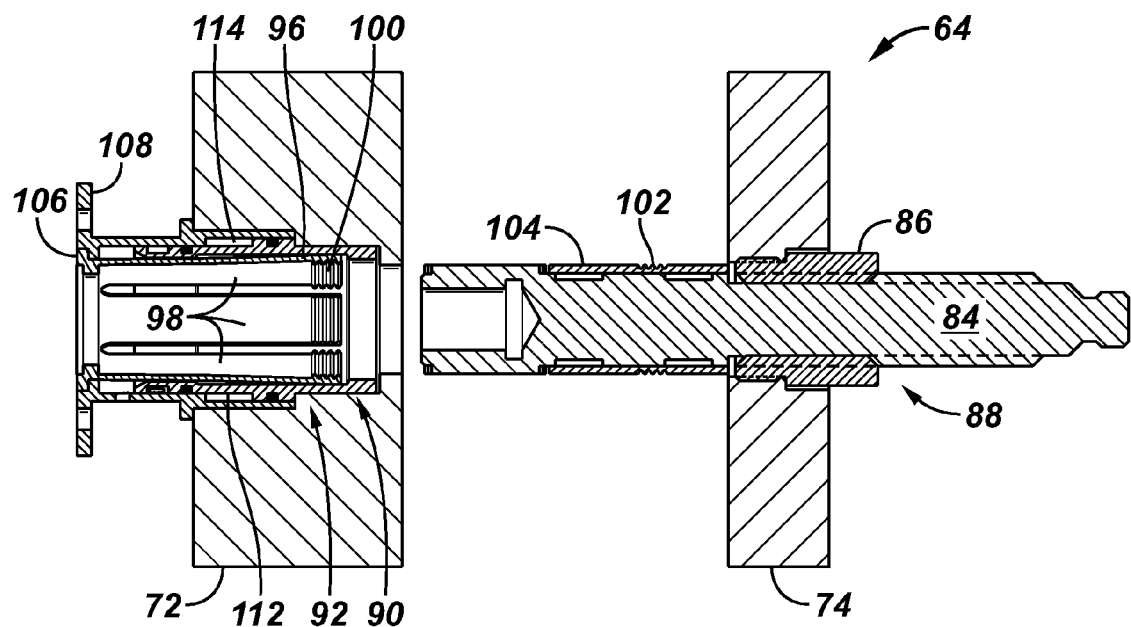
FIG. 10 is an illustration similar to that of FIG. 9 but showing full disconnection of the disconnect system, according to an embodiment of the disclosure.

Once collet 96 is unlocked, the screw 84 may be separated from motor shaft 94, as illustrated in FIG. 9. By way of example, the connector plate 74 and its corresponding hose bundle 40 may simply be pulled to separate the screw 84 from the motor shaft 94 and to ultimately slide the screw 84 entirely out of collet mechanism 92, as illustrated in FIG. 10. The ability to release screw 84 provides a secondary mechanism for disconnecting the connectors 70 and for releasing the plate 74 (along with its corresponding hose bundle 40) from the skid 58, as illustrated in FIG. 2.

In an operational example, weather or other influences may lead to an attempted disconnection and release of hose bundles 40 via primary release 88. However, if primary release 88 does not function properly the secondary release 90 may be actuated. In operating the secondary release 90 of the illustrated embodiment, hydraulic fluid under pressure is supplied to hydraulic chamber 114 and is applied against slidable piston 112. In many applications, the volume of hydraulic fluid used to operate the secondary release can be sufficiently small to allow use of a small hand pump to efficiently provide power for separating the connector plate 72, 74. The hydraulic pressure is built up until retention member 116 is released, e.g. sheared, to allow movement of slidable piston 112. At the end of the stroke of slidable piston 112, the collet 96 is released by allowing retention mechanisms 100 to spring radially outwardly with respect to corresponding retention mechanisms 102. This allows the screw 84 with its bearing sleeve 104 to move out of collet mechanism 92. By way of example, tension may be applied on the corresponding hose bundle 40 to pull the assembly away from the fixed coupling plate 72. This action disconnects the connector 70 and allows the hose bundle 40 to separate from floating vessel 20.

Depending on the offshore application, the overall offshore system may comprise a variety of platforms, vessels, components and configurations of components. Similarly, the skid and the associated quick disconnect system may be constructed with a many types of components in a variety of configurations. For example, the skid may be a self-contained transportation skid providing umbilical hoses, multi-coupling hydraulic connections, release mechanisms, the release control console, the retrievable flotation system, and/or other components arranged in suitable configurations for a given offshore application. Additionally, the quick disconnect system may comprise primary release mechanisms and individual or plural secondary release mechanisms. In some applications, both the primary release and the secondary release(s) are hydraulically actuated. However, the primary release and the secondary release may be actuated electrically, mechanically, and/or via other suitable sources of actuating power. The number of powered hose reels on the skid and the number of associated hose bundles also may vary according to the parameters of a given operation.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:
1. A system for facilitating an oilfield operation with respect to a subsea wellbore, comprising:
  a self-contained transportation skid that may be positioned on a vessel, the self-contained transportation skid comprising:
    a plurality of powered hose reels;
    a plurality of hose bundles, each hose bundle being mounted on a corresponding powered hose reel of the plurality of powered hose reels, the plurality of hose bundles comprising control lines, including hydraulic lines and electrical lines, for providing hydraulic and electrical communication with equipment on a platform;
    a plurality of release mechanisms coupled to the plurality of hose bundles to enable selective disconnection of the control lines and release of the plurality of hose bundles from the self-contained transportation skid, at least one release mechanism being mounted on each powered hose reel, wherein each release mechanism comprises
      a primary release mechanism, wherein the primary release mechanism comprises a motor operationally coupled with a pair of coupling connector plates by a drive screw and coupled to the drive screw by a plurality of retention mechanisms, the drive screw of the primary release mechanism configured to force the disconnection of the control lines and to release the hose bundle from the skid by forcing apart the coupling connector plates when rotated by the motor, and
      a secondary release mechanism to disable the primary release mechanism by radially displacing the retention mechanisms from the drive screw, thereby enabling release of the hose bundle from the skid; and a retrieval flotation system for attachment to the release mechanisms to facilitate retrieval of the release mechanism and hose bundles after disconnection thereof.

2. The system as recited in claim 1, further adapted for a coiled tubing operation, comprising a coiled tubing reel mounted on the vessel, and wherein the plurality of powered hose reels comprises at least three powered hose reels.

3. The system as recited in claim 1, wherein at least one of the hose bundles provides hydraulic power and electrical control for an injector.

4. The system as recited in claim 1, wherein at least one of the hose bundles provides hydraulic power for a blowout preventer.

5. The system as recited in claim 1, wherein each release mechanism is mounted in a core of a corresponding powered hose reel.

6. The system as recited in claim 1, wherein the pair of coupling connector plates comprises hydraulic and electrical connectors.

7. The system as recited in claim 6, wherein the motor is a hydraulic motor.

8. The system as recited in claim 1, wherein the secondary release mechanism is hydraulically operated.

9. The system as recited in claim 1, wherein the secondary release mechanism separates the motor from one of the connector coupling plates.

10. A system for facilitating a coiled tubing operation with respect to a subsea wellbore, comprising:
a powered hose reel that may be mounted on a skid; and
a release mechanism mounted on the powered hose reel to engage a hose bundle having a plurality of control lines, the release mechanism comprising:
a plurality of control line connectors;
a primary release to disconnect the control lines and to release the hose bundle from the skid, wherein the primary release comprises a motor arranged to provide a drive force to selectively disconnect the plurality of control line connectors, the motor coupled to a drive screw by a plurality of retention mechanisms and engaged with at least one connector plate of a pair of connector plates, the drive screw configured to force apart the connector plates when rotated by the motor; and
a secondary release configured to radially displace the retention mechanisms from the drive screw, thereby enabling release of the motor from the drive screw and disabling the motor from engagement with the at least one connector plate, thereby enabling the disconnection of the control lines and the release of the hose bundle from the skid.

11. The system as recited in claim 10, wherein the motor comprises a hydraulic motor.

12. The system as recited in claim 10, wherein the secondary release is hydraulically actuated.

13. The system as recited in claim 10, wherein the secondary release comprises a collet positioned such that release of the collet enables separation of a pair of connector plates.

14. The system as recited in claim 10, wherein the secondary release comprises a hydraulic piston shiftable between a locked retention position and a release position allowing disconnection of the control lines and release of the hose bundle.

15. A system for simultaneously releasing a plurality of control lines, comprising:
a first coupling connector plate having a plurality of first control line connectors;
a second coupling connector plate having a plurality of second control line connectors;
a motor operationally coupled with the first coupling connector plate and the second coupling connector plate to selectively disengage the plurality of first control line connectors from the plurality of second control line connectors, wherein the motor is coupled to a drive screw by a plurality of retention mechanisms and wherein the drive screw is configured to force apart the first and second coupling connector plates when rotated by the motor; and
a secondary release mechanism configured to disengage the motor from the drive screw by disengaging the retention mechanisms, thereby disabling the ability of the motor to force apart the connector plates, and enabling the disengagement of the connector plates and the plurality of first control line connectors from the plurality of second control line connectors, wherein the secondary release mechanism comprises a releasable collet securing the motor to the drive screw via the retention mechanisms and operable to disengage the motor from the drive screw by radially displacing the retention mechanisms.

16. The system as recited in claim 15, wherein the plurality of first and second control line connectors comprises at least one hydraulic control line connector and at least one electrical control line connector on each of the first and second coupling connector plates.

17. The system as recited in claim 15, wherein the motor is a hydraulic motor.

18. The system as recited in claim 15, wherein the secondary release mechanism is controlled hydraulically.

19. The system as recited in claim 15, wherein the first coupling connector plate is mounted to a coiled tubing reel and the second coupling connector plate is connected to a hose bundle.

20. The system as recited in claim 15, wherein the collet separates a shaft of the motor from the drive screw.

* * * * *